United States Patent
Miller

(10) Patent No.: US 9,600,421 B2
(45) Date of Patent: Mar. 21, 2017

(54) SYSTEMS AND METHODS FOR LOW-LATENCY ENCRYPTED STORAGE

(75) Inventor: Mark E. Miller, Mission Viejo, CA (US)

(73) Assignee: Conexant Systems, Inc., Irvine, CA (US)

( * ) Notice: Subject to any disclaimer, the term of this patent is extended or adjusted under 35 U.S.C. 154(b) by 2226 days.

(21) Appl. No.: 12/469,647

(22) Filed: May 20, 2009

(65) Prior Publication Data

US 2010/0299538 A1 Nov. 25, 2010

(51) Int. Cl.
| | |
|---|---|
| *G06F 12/14* | (2006.01) |
| *G06F 21/78* | (2013.01) |
| *G06F 21/85* | (2013.01) |
| *H04L 9/06* | (2006.01) |
| *H04K 1/00* | (2006.01) |
| *H04L 9/00* | (2006.01) |
| *H04L 9/28* | (2006.01) |

(52) U.S. Cl.
CPC ......... *G06F 12/1408* (2013.01); *G06F 21/78* (2013.01); *G06F 21/85* (2013.01); *H04L 9/0637* (2013.01); *G06F 2221/2107* (2013.01); *H04L 2209/08* (2013.01); *H04L 2209/125* (2013.01); *H04L 2209/20* (2013.01)

(58) Field of Classification Search
USPC ............................................. 713/190; 380/28
See application file for complete search history.

(56) References Cited

U.S. PATENT DOCUMENTS

| | | | | |
|---|---|---|---|---|
| 5,905,993 | A * | 5/1999 | Shinohara | G06F 3/0601 711/102 |
| 6,725,328 | B2 * | 4/2004 | Kano | G06F 3/0605 711/112 |
| 7,565,539 | B2 * | 7/2009 | Agarwal | 713/171 |
| 8,060,743 | B2 * | 11/2011 | Struik | 713/160 |
| 8,155,308 | B1 * | 4/2012 | Poo et al. | 380/29 |
| 2005/0060560 | A1 * | 3/2005 | Sibert | 713/193 |
| 2006/0005047 | A1 * | 1/2006 | Lekatsas et al. | 713/193 |

(Continued)

OTHER PUBLICATIONS

Federal Information Processing Standards Publication 197, "Advanced Encryption Standards (AES)", Nov. 26, 2001, pp. 1-51.

(Continued)

*Primary Examiner* — Krista Zele
*Assistant Examiner* — Tariq Najee-Ullah
(74) *Attorney, Agent, or Firm* — Haynes & Boone, LLP

(57) ABSTRACT

Encrypted storage often introduces unwanted latency in access. This delay can result in a processor having to wait for critical data thus slowing performance. Generally speaking, the latency is at most an issue when reading from encrypted storage, since the processor may need the information read from encrypted storage to proceed. During a write operation, there typically is not an issue because the processor does not need to wait for the end of the write operation to proceed. A variant of counter (CTR) mode for a block cipher can be used to perform the majority of the decryption operation without knowledge of the ciphertext, therefore the majority of the decryption operation can be performed concurrently with the retrieval of the ciphertext from memory. In order to further secure the encrypted storage, a light encryption can be performed to further obfuscate the ciphertext.

12 Claims, 21 Drawing Sheets

(56) References Cited

U.S. PATENT DOCUMENTS

| | | | |
|---|---|---|---|
| 2006/0053112 A1* | 3/2006 | Chitkara et al. | 707/9 |
| 2007/0110225 A1* | 5/2007 | Leventhal et al. | 380/28 |
| 2008/0005564 A1* | 1/2008 | Agarwal | 713/171 |
| 2008/0044012 A1* | 2/2008 | Ekberg et al. | 380/30 |
| 2009/0208018 A1* | 8/2009 | Buckingham et al. | 380/277 |
| 2009/0310778 A1* | 12/2009 | Mueller et al. | 380/44 |
| 2010/0115286 A1* | 5/2010 | Hawkes et al. | 713/189 |
| 2010/0199091 A1* | 8/2010 | Ho | 713/168 |

OTHER PUBLICATIONS

Shannon, C. E., "Communication Theory of Secrecy Systems", pp. 1-60.

Andem, Vikram Reddy, "A Cryptanalysis of the Tiny Encryption Algorithm", Graduate Scholl of the University of Alabama, pp. 1-68.

Morris Dworkin, Recommendation for Block Cipher Modes of Operation, Methods and Techniques, Computer Security, NIST Special Publication 800-38A, 2001 Edition, NIST National Institute of Standards and Technology, Technology Administration U.S. Department of Commerce, pp. 1-66.

* cited by examiner

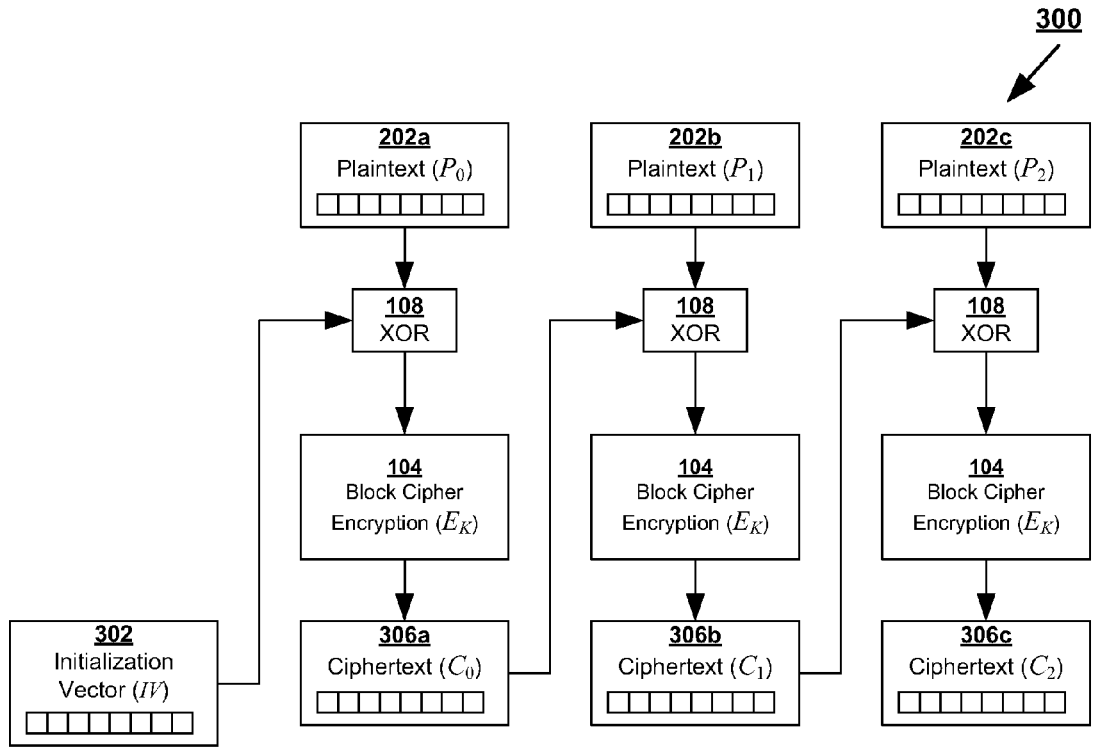
FIG. 3 (Prior Art)
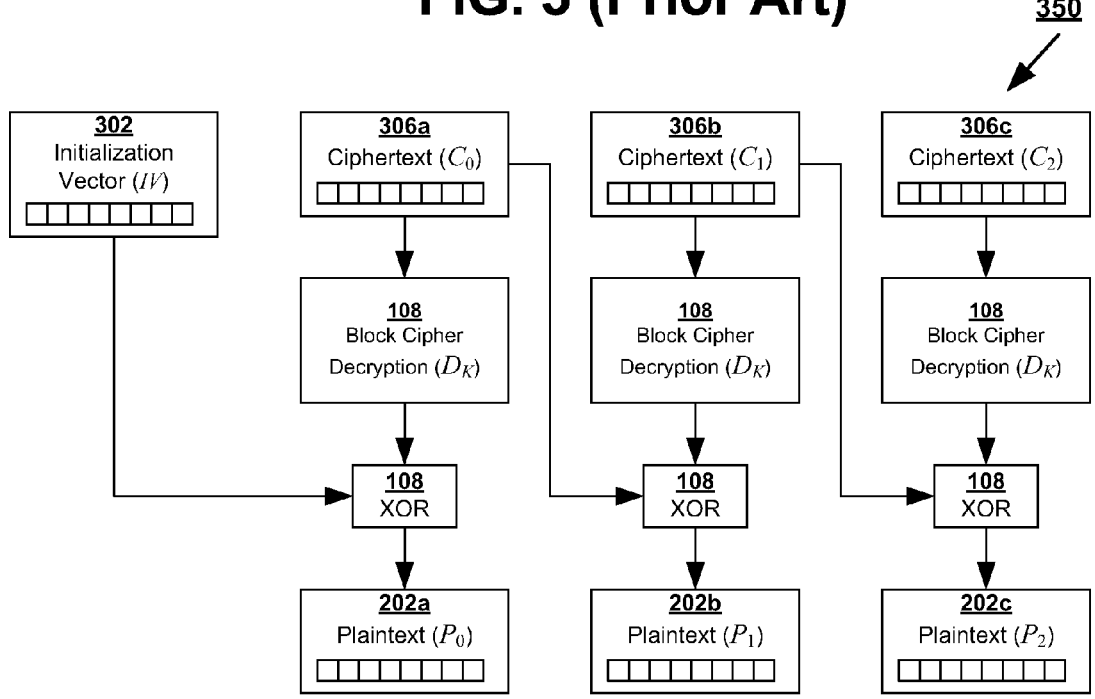

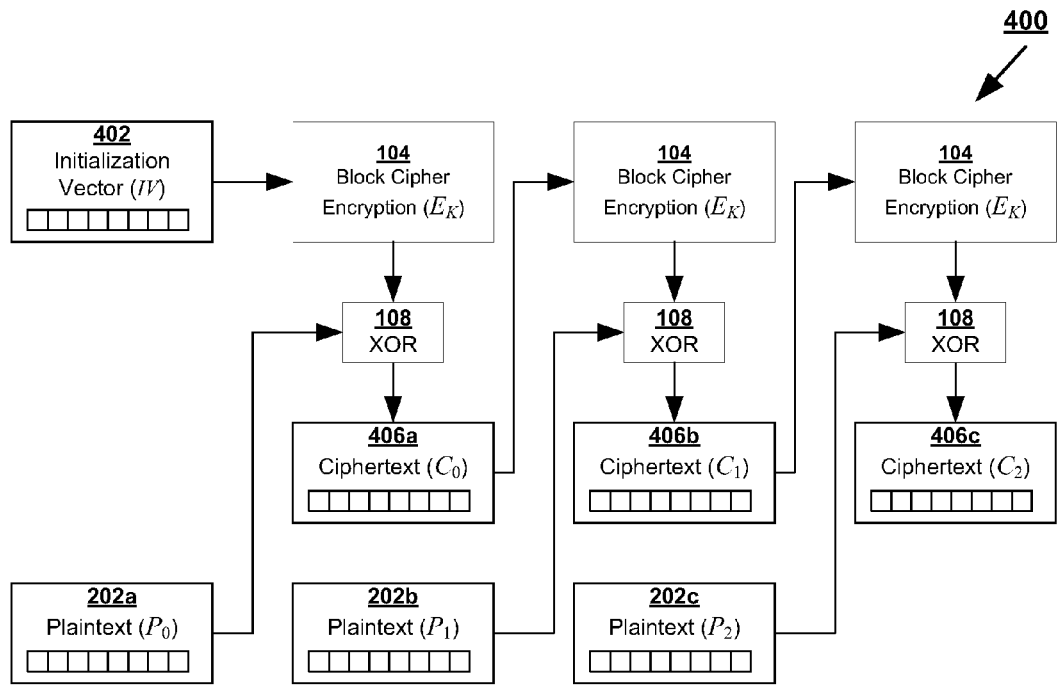
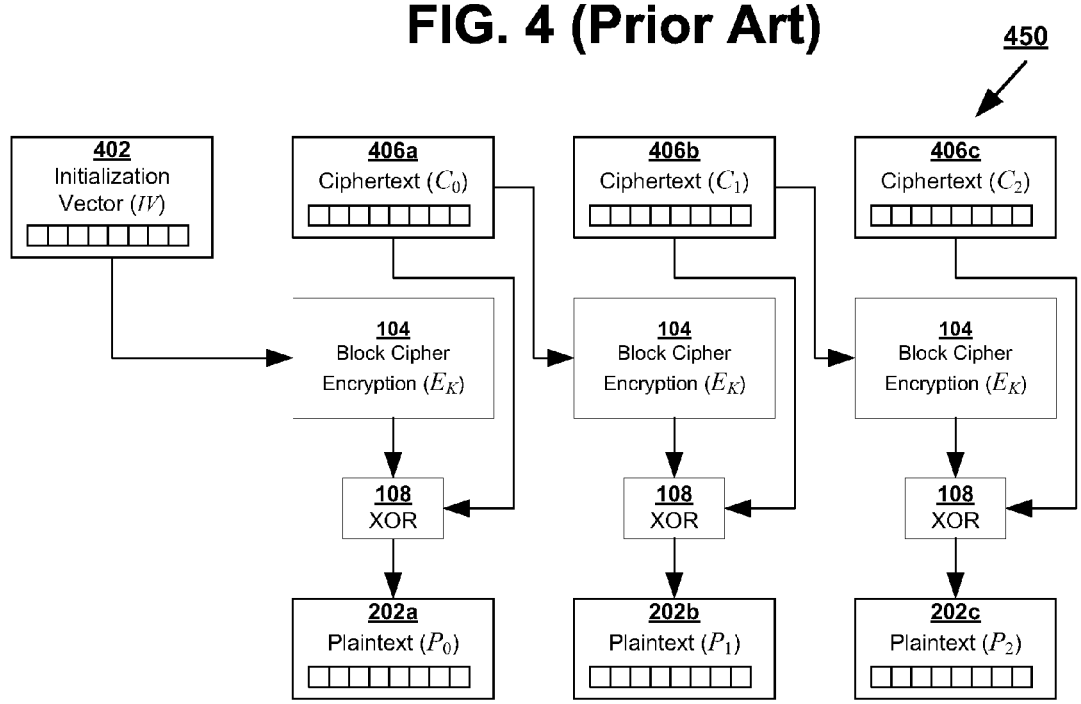
FIG. 4 (Prior Art)

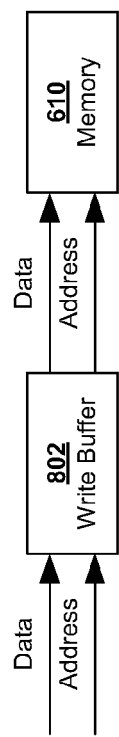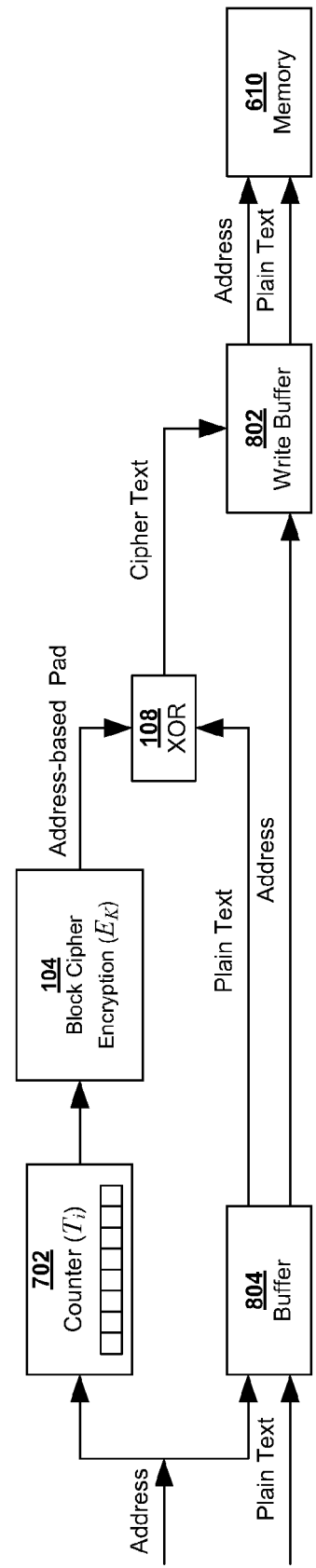

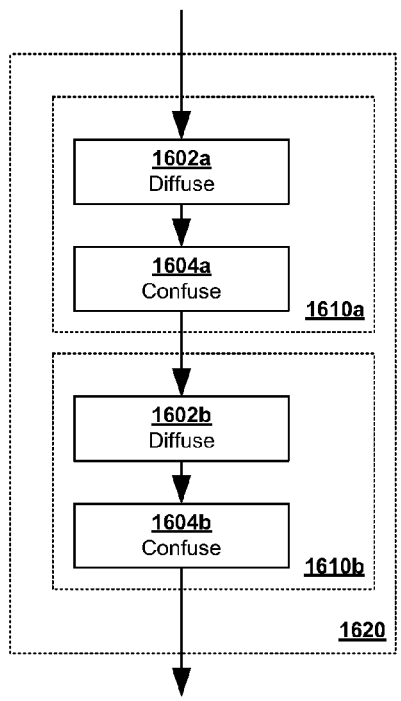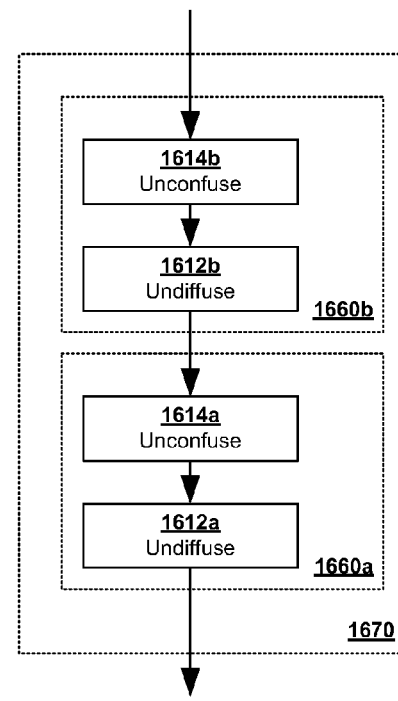
FIG. 16C
FIG. 16D

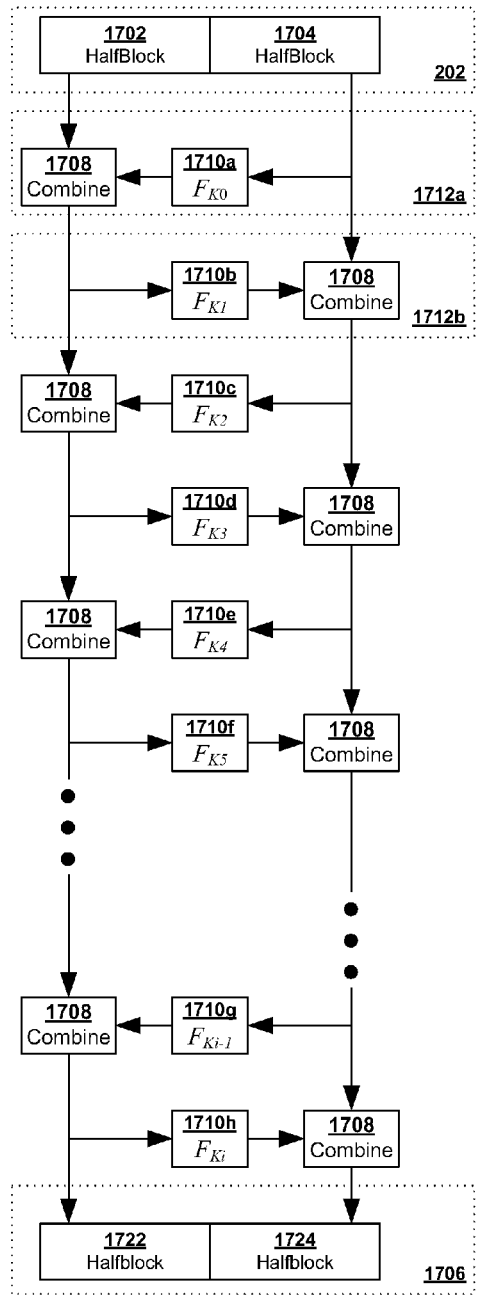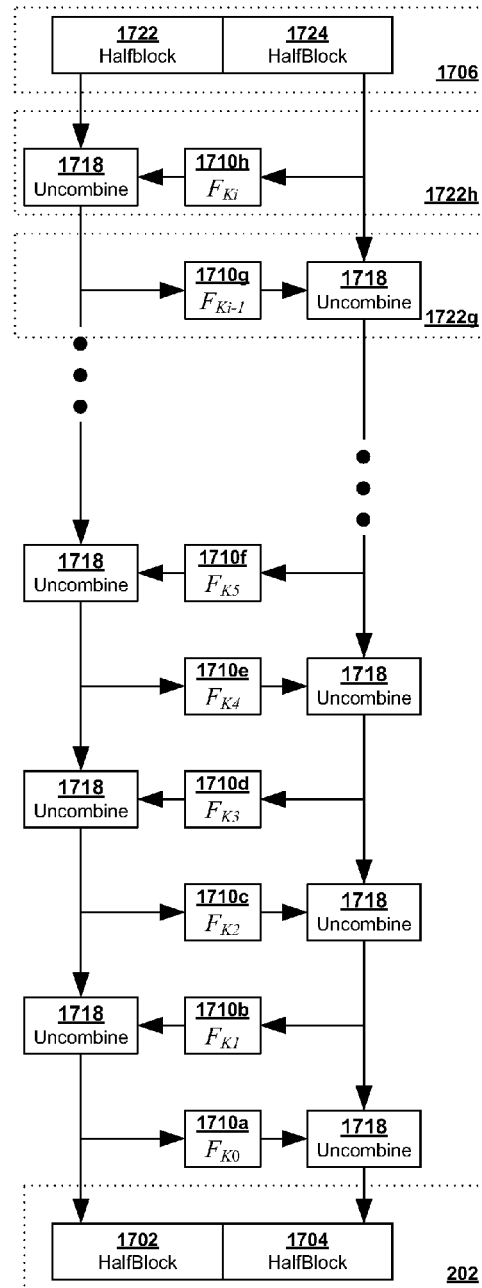
FIG. 17A  FIG. 17B

SYSTEMS AND METHODS FOR LOW-LATENCY ENCRYPTED STORAGE

BACKGROUND OF THE INVENTION

1. Field of the Inventions

The invention relates generally to encryption for storage and specifically to the use of block ciphers in modified counter mode for encrypted storage.

2. Background Information

A symmetric cipher is an encryption system which uses the same key for encrypting and decrypting messages. Therefore, the encrypting party and the decrypting party have to share this key. A message that is to be encrypted is known as a plaintext message and once the message is encrypted it is referred to as a ciphertext message. In particular, a block cipher encrypts a fix size plaintext message into a fixed size ciphertext message. Typically the size of the plaintext and ciphertext are the same referred to as the block size. In the operation of a block cipher, the same plaintext yields the same ciphertext when encrypted with the same key.

FIG. 1 illustrates a typical block cipher. Plaintext (P) 102 is fed into block cipher 104 and an encryption function ($E_K$) based on key K is applied to plaintext 102 resulting in ciphertext (C) 106, i.e., $C=E_K(P)$. Decryption involve using block cipher 108 which applies a corresponding decryption function ($D_K$) also based on key K, i.e., $P=D_K(C)$.

There are many block ciphers in use today, such as Advanced Encryption Standard (AES), blowfish, twofish, Data Encryption Standard (DES), triple-DES, International Data Encryption Algorithm (IDEA), RC6 (RC variants has a has a long and ambiguous history some attribute it to mean "Rivest Cipher" or "Ron's Code.) These block ciphers commonly have block sizes of 64, 128, 192 and 256 bits. However, typically, a message longer than many block sizes need to be encrypted. Several strategies are used to encrypt long messages.

The most straightforward of these strategies is known as electronic codebook (ECB) mode. FIG. 2A illustrates how plaintext message 212 is encrypted using ECB mode. Plaintext message 212 is broken up into plaintext blocks 202a, 202b, 202c, etc, of the block size of the block cipher. Each block is encrypted using block cipher 104 to produce ciphertext blocks 206a, 206b, 206c, etc. Block cipher 104 can be implemented with a single cipher or multiple copies of the single cipher in a parallel fashion. Typically, it is a single cipher unless a high degree of parallelism is desired. Ciphertext blocks 206a, 206b, 206c, etc can be assembled into ciphertext message 216.

FIG. 2B illustrates the decryption of ciphertext message 216 using ECB mode. Block cipher 108 is used to decode blockwise the constituent ciphertext blocks 206a, 206b, 206c, etc, into plaintext blocks 202a, 202b, 202c which can be assembled into plaintext message 212. Mathematically, encryption follows $C_i=E_K(P_i)$ and decryption follows $P_i=D_K(C_i)$.

ECB mode is typically adapted to blocks of data and while applicable to streams, there was a need to use other approaches to strengthen encryption in a stream context. Several approaches to convert the block cipher into a stream cipher are commonly used. Two general approaches are chaining modes and feedback modes. For the remaining figures, the breaking apart of messages into blocks and the assembling of blocks into a message is omitted for clarity. Furthermore, for the sake of example, only three stages of encryption are shown. It should be understood that an arbitrary number of stages may be present.

Chaining modes typically use the ciphertext generated in previous encryption blocks and combine them with the plaintext prior to encryption. FIG. 3 illustrates the encryption and decryption of using cipher-block chaining (CBC) mode. In essence to encrypt, the previous ciphertext block is XORed to the plaintext block. For example as shown in encryption system 300, ciphertext block 306a is XORed with plaintext block 202b before applying block cipher 104 to produce ciphertext block 306b. The process begins with initialization vector 302 which is typically a random block shared between the encrypting party and the decrypting party. The corresponding decryption is illustrated by system 350. The encryption is defined by $C_i=E_K(P_i \oplus E_{i-1})$ and the decryption by $P_i=D_K(C_i) \oplus C_{i-1}$.

Another example of chaining mode is propagating cipher-block chaining (PCBC) mode. This is similar to CBC mode except that the previous plaintext block is also XORed with the previous ciphertext block and the plaintext block. Mathematically, the encryption is defined by $C_i=E_K(P_i \oplus P_{i-1} \oplus C_{i-1})$ and the decryption by $P_i=D_K(C_i) \oplus C_{i-1} \oplus P_{i-1}$.

Feedback modes utilize only the encryption portion of block cipher and are often employed to minimize the complexity of the encryption. Additionally, it enables the use of one-way ciphers which can encrypt efficiently but not decrypt efficiently. FIG. 4 illustrates the cipher feedback mode (CFB). In this mode, the previous ciphertext block is encrypted and XORed with the current plaintext block to produce a new ciphertext block. For example as shown in encryption system 400, ciphertext block 406a is encrypted and XORed with plaintext block 202b to produce ciphertext block 406b. Again an initialization vector (402) is used to start the process. Decryption is shown in system 450. Mathematically, the encryption is defined by $C_i=P_i \oplus E_K(C_{i-1})$ and the decryption by $P_i=C_i \oplus E_K(C_{i-1})$. It should be noted that block cipher decryption is not used in decryption and that the decryption and encryption are nearly identical.

Another noteworthy feedback mode is output feedback (OFB) mode. In this mode, the output block produced by the block cipher encryption is supplied to the input block of the next block cipher. The ciphertext block is generated by XORing the plaintext block with the output block. Mathematically, the encryption is defined by $C_i=P_i \oplus O_i$ and the decryption by $P_i=C_i \oplus O_i$, where $O_i=E_K(O_{i-1})$. It should be noted that structurally, the same configuration for encryption can be used for decryption.

In addition to chaining mode and feedback mode, one other mode of using block cipher is counter (CTR) mode. CTR mode is inspired by the one-time pad cipher which basically calls for a random block being XORed with the plaintext to generate ciphertext. However, one-time pad ciphers are impractical. So rather than randomly select the blocks, a sequence of known blocks, $T_0, T_1, T_2, \ldots$ is encrypted to produce a cryptographically unpredictable sequences of one-time pads, $E_K(T_0), E_K(T_1), E_K(T_2), \ldots$. In keeping with convention the known blocks $T_0, T_1, T_2, \ldots$ will be referred to as counter blocks even though as is discussed below, they need not be counters.

FIG. 5A shows CTR mode encryption system 500. For example, ciphertext block 506b is created by XORing plaintext block 202b with the result by block cipher 104 of encrypting "counter" block 502b. Mathematically, the encryption is defined by $C_i=P_i \oplus E_K(T_i)$. Likewise, FIG. 5B shows the corresponding CTR mode decryption system 550. Specifically, ciphertext block 506a can be deciphered by XORing the ciphertext block 506a with the result of block cipher 104 of encrypting counter block 502a to recover plaintext block 202a. Mathematically, the decryption is defined by $P_i=C_i \oplus E_K(T_i)$.

FIG. 5C shows a common form of the "counter" used in CTR mode. Counter block 502 comprises nonce 520 and counter 522. Nonce 520 is a one-time random number which is shared between the encrypting party and the decrypting party. Counter 522 is a counter of bit length less than the block size of the counter block. The next result of this construction of a counter block is that $T_i=T_{i-1}+1$. While, the counter block is a true counter, any sequence of $T_i$ can work, but practical considerations may call for more predictable sequences.

While encryption is often used for communications, encryption can also be used for storage. Generally, streaming modes such as CBC, PCBC, CFB and OFB are useful for communications where information is sent in streams, they are not very efficient for storage applications.

FIG. 6A illustrates a typical encrypted storage system. When a storage request is given to controller 602, the content is encrypted by cipher 604. The encrypted content is then stored in storage 606. When a read request is given to controller 602, encrypted content is retrieved from storage 606 and decrypted using cipher 604. In the case of hard disk, it may be more efficient to retrieve large blocks at a time in which case streaming modes could be used across the large block. For example, if 2048-byte blocks are used to store on a hard disk, a CBC mode could be used for a 256-bit (32-byte) block cipher across the 2048 bytes in the hard disk block. However, if storage 606 is memory such as static random access memory (SRAM) or dynamic random access memory (DRAM), where memory is access in a random access fashion, streaming modes are not practical. ECB could be used, but the encryption/decryption operations can introduce unacceptable latency in accessing memory.

FIG. 6B illustrates a data flow in an encrypted memory during a read from memory. An address is supplied to memory 610 which retrieves the ciphertext data. Decryption block 612 is applied to the ciphertext data to retrieve the data in plaintext. If ECB is used, the block cipher operation of ECB must begin after the ciphertext data is retrieved and would not allow for parallel operations and hence would add decryption time to the latency of data retrieval.

FIG. 6C illustrates a data flow into an encrypted memory during a write to memory. Data as plaintext is encrypted by encryption block 614 to produced encoded data as ciphertext which is then stored into memory 610. Typically latency in a write operation is of less concern. In typical memory usage data is written to memory after a processor has need for the information whereas when a processor reads from memory it typically is ready to use it. If a memory is properly buffered, additional latency in write operations due to encryption should not cause a processor to wait more than it would for an unencrypted write.

Encryption of content going into random access memory (RAM) has key applications in point of sale (POS) devices where credit card numbers or account information could be stored which awaiting validation and in digital rights management (DRM) where a movie or song could be received from a transmission, and temporarily stored in memory. Encryption could prevent identity theft in POS devices and prevent unauthorized duplication of copyrighted material. Accordingly, various needs exist in the industry to address the aforementioned deficiencies and inadequacies.

SUMMARY OF INVENTION

An encrypted storage can employ CTR mode encryption to reduce latency during data retrieval from storage. The storage comprises a memory, an encryption module and an XOR module. To retrieve data stored in the encrypted storage from a particular memory address, a counter function converts the memory address into an address based counter. The address based counter is then encrypted into an address based pad. The XOR module receives input data retrieved from the encrypted storage and produces plaintext data by XORing the address based pad with the input data. In the simplest implementation, the input data is the ciphertext data retrieved from the encrypted storage. Optionally, light encryption may be applied in the encryption process. In such a circumstance, "light decryption" can be applied to the ciphertext data retrieved from the encrypted storage to produced input data supplied to the XOR module. In addition random padding added during the encryption process can also be discarded prior to reception by the XOR module.

Alternatively, the XOR module can be thought of as receiving encrypted data stored in memory and applying the XOR operation to the address based pad with the encrypted data to obtain the plaintext data. The XOR module can apply the XOR operation directly to the encrypted data or the encrypted data may be transformed by decryption performed by a light encryption cipher prior to application of the XOR operation. Again, random padding added during the encryption process can also be discarded prior to the application of the XOR operation.

The light encryption block cipher could comprise a plurality of parallel block ciphers having a block size smaller than the block size of the block cipher in the encryption module. Alternatively, it could comprise a predetermined number of rounds of a confusion-diffusion cipher, such as AES. It could also comprise a predetermined number of rounds of a Feistel Network, such as TEA, XTEA or XXTEA.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 illustrates the encryption and decryption of using CBC mode;

FIG. 4 illustrates the encryption and decryption of using CFB mode;

FIG. 8A illustrates a typical buffered write operation;

FIG. 8B illustrates a write operation into memory encrypted using the address based CTR mode;

FIG. 16C shows a lightened version of the block cipher shown in FIG. 16A.

FIG. 16D illustrates the decryption of the block cipher encryption shown in FIG. 16C.

FIG. 17A illustrates encryption in a Feistel network block cipher;

FIG. 17B illustrates decryption in a Feistel network block cipher;

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As described above, in certain applications, it is desirable to encrypt fast storage devices such as dynamic random access memory (DRAM) and static random access memory (SRAM). Chaining and feedback modes are not suitable for random access to data such as in random access memory (RAM). ECB can work, but introduces latency due to the need to encrypt and decrypt every block.

Figure 1:
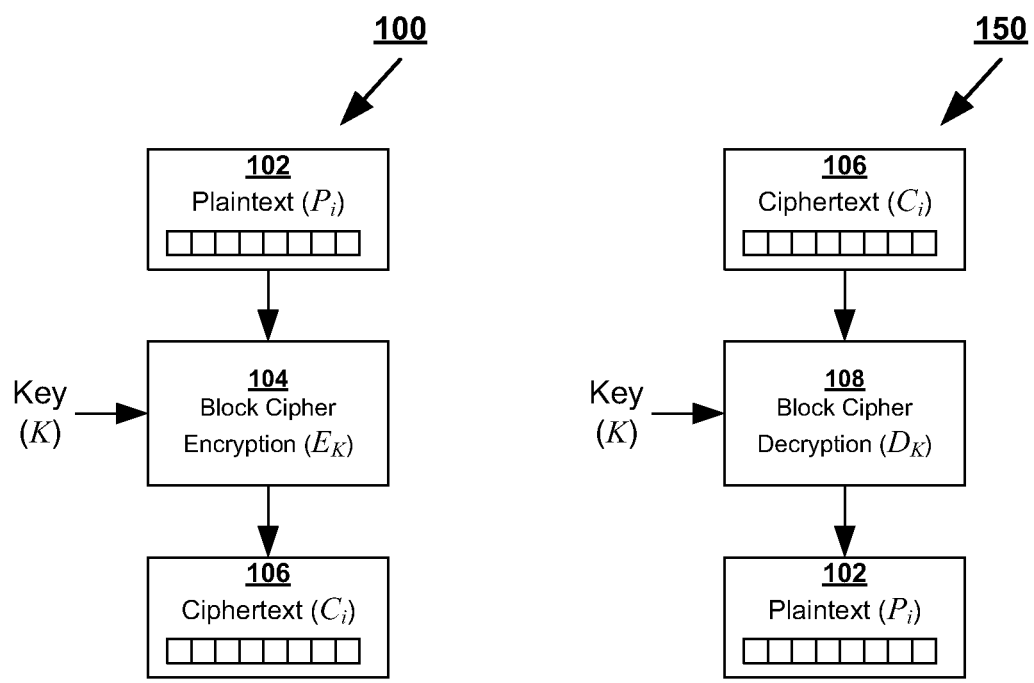
FIG. 1 illustrates a typical block cipher.
Figure 2A:
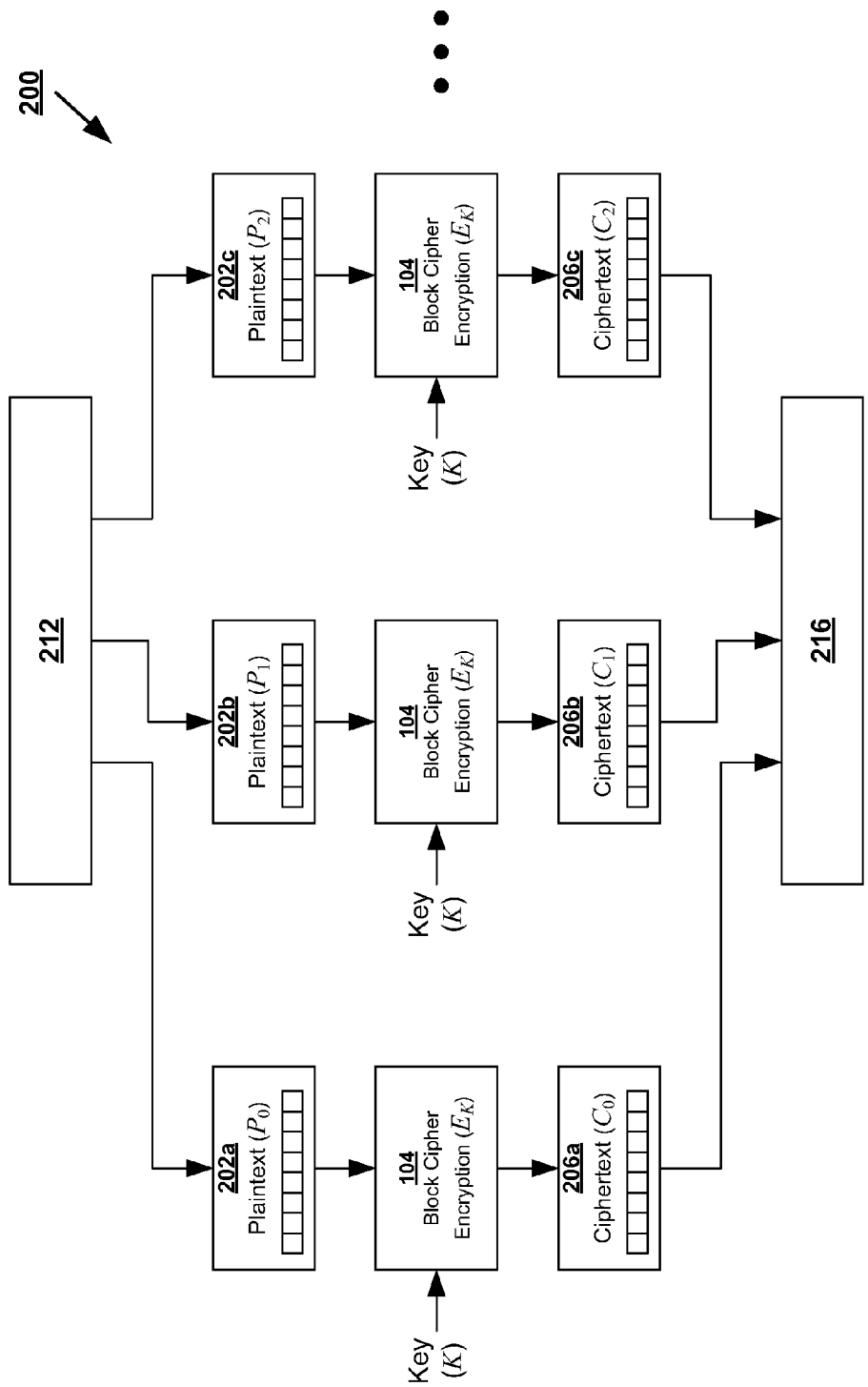
FIG. 2A illustrates encryption of a plaintext message using ECB mode.
Figure 2B:
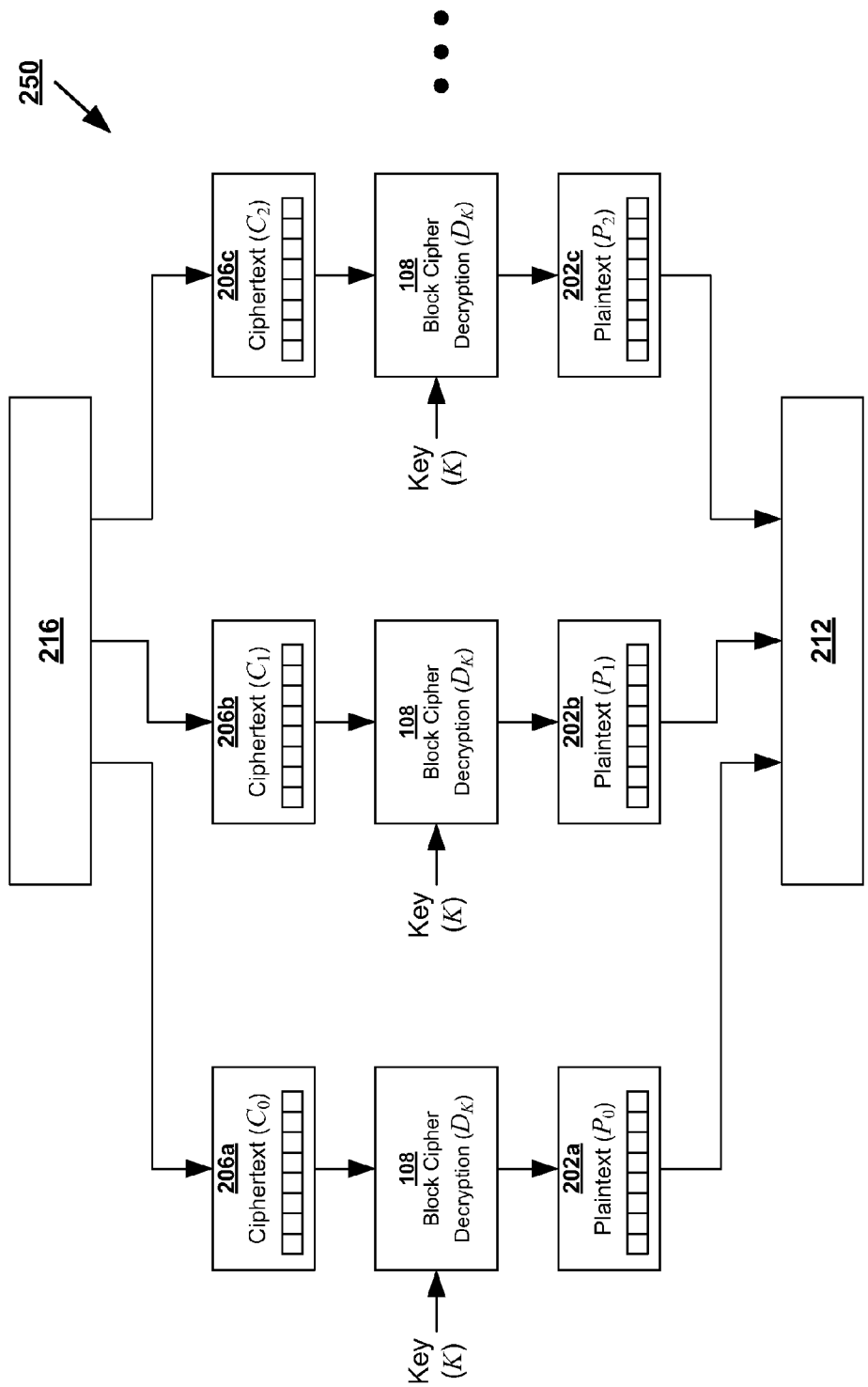
FIG. 2B illustrates decryption of a ciphertext message using ECB mode.
Figure 5A:
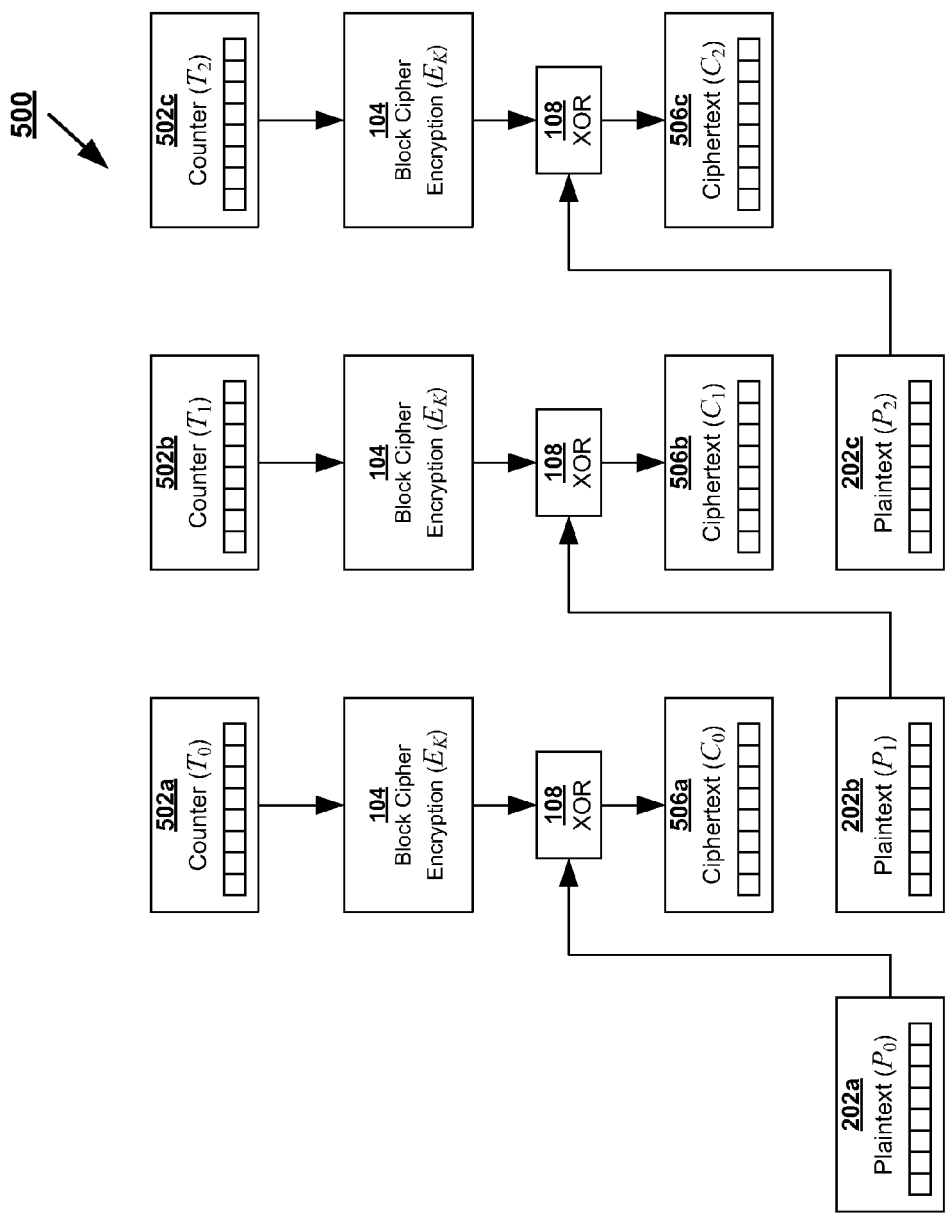
FIG. 5A shows CTR mode encryption system.
Figure 5B:
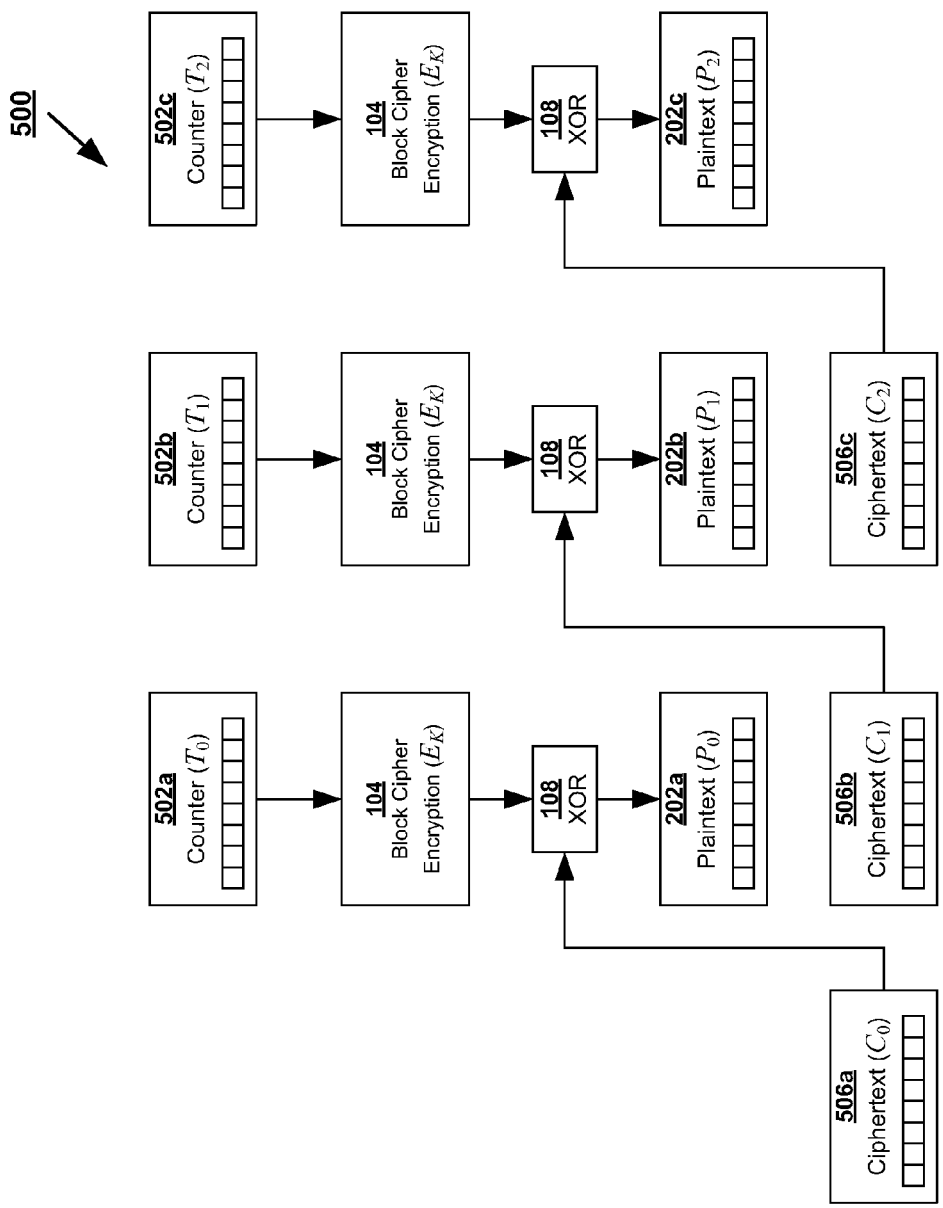
FIG. 5B shows the corresponding CTR mode decryption system.
Figure 5C:
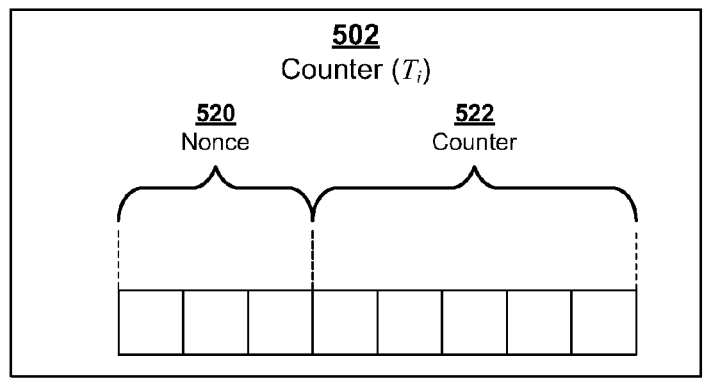
FIG. 5C shows a common form of the "counter" used in CTR mode.
Figure 6A:
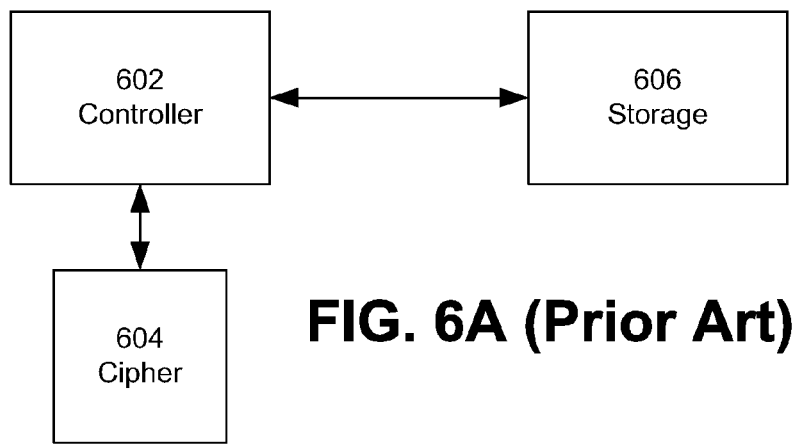
FIG. 6A illustrates a typical encrypted storage system.
Figure 6B:
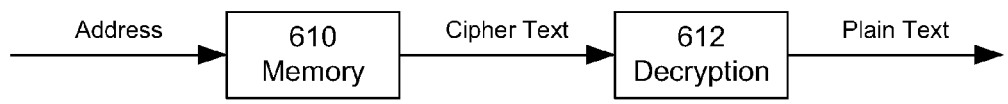
FIG. 6B illustrates a data flow in an encrypted memory during a read from memory.
Figure 6C:
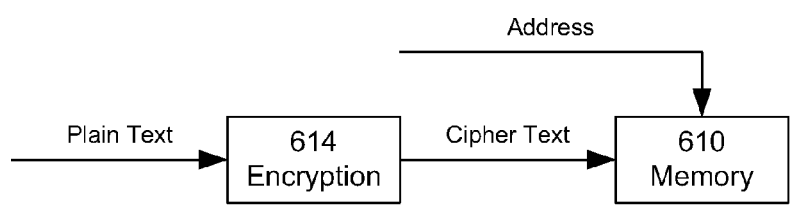
FIG. 6C illustrates a data flow into an encrypted memory during a write to memory.

Although CTR mode is often used as a stream cipher, where the counter block is of the construction described in FIG. 5C, it need not be a stream cipher if a different construction is used for the counter block. For example, if the memory address of a storage location is incorporated into the counter block, a CTR mode cipher can operate in a random access manner, that is, only the address of the memory is necessary to retrieve an encrypted block from memory or store a block to memory in an encrypted form.

Figure 7A:
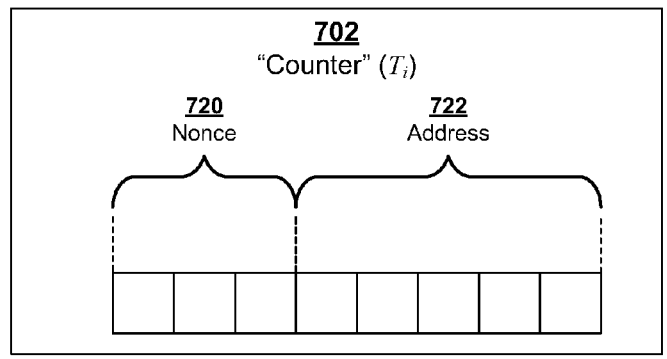
FIG. 7A shows a construction of a counter block which is dependent on memory address and not a counter.

FIG. 7A shows a construction of a counter block which is dependent on memory address and not a counter. Counter block 702 comprises nonce 720 and memory address 722. For example, if the address space is 32-bit and the block cipher is 256-bit, a 224-bit nonce can be appended, prepended or otherwise combined to the memory address to form the counter block. For the purposes of this disclosure, the operation of constructing a "counter" block out of an address shall be referred to as a counter function ($T_i(A_i)$).

Figure 7B:
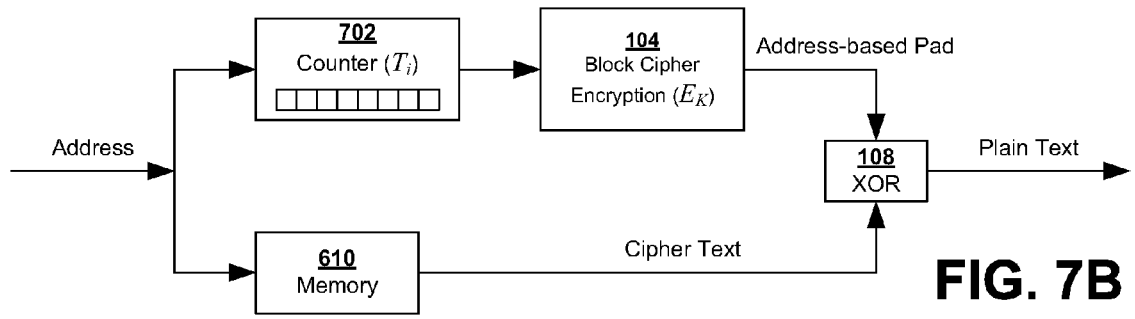
FIG. 7B illustrates a method of reading from encrypted memory using an addressed based CTR mode.

FIG. 7B illustrates a method of reading from encrypted memory using an addressed based CTR mode. A request to read a given address is supplied to both memory 610 and counter function 702. An addressed based "counter" produced by counter function 702 is then encrypted by block cipher 104 which produces an address based pad. For the purposes of this disclosure an encrypted address based counter shall be referred to as an "address based pad." In the meantime, during the encryption operation, the ciphertext retrieved from memory 610 where it can quickly be XORed with the address based pad to retrieve the data in plaintext. Typically, the amount of time the encryption takes is comparable to the amount of time it takes to retrieve data from a DRAM, so by parallelizing the calculation of the address based pad and the memory retrieval, no additional latency would be experienced by the processor in retrieving from encrypted memory. In the case of SRAM, the read times are faster and this would introduced additional latency.

In regards to the write operation, FIG. 8A illustrates a typical buffered write operation. Because DRAMs are relatively slow compared to processor speeds, when a processor writes to DRAM, the data and address are buffered in write buffer 802, which typically comprises faster memory. When the write is posted to write buffer 802, the processor is free to return to other operations. Meanwhile, the data is transferred from the write buffer to memory 610.

FIG. 8B illustrates a write operation into memory encrypted using the address based CTR mode. When a write request is given, the address and data is stored into buffer 804, the processor is then free to return to other operations. Meanwhile counter function 702 produces an address based counter which is then encrypted by block cipher 104 which produces an address based pad. The data is then retrieved from buffer 804 and XORed with the address based pad. The resultant cipher text is then written to memory 610 and may optionally first be stored in write buffer 802. However, depending on the implementation of the encryption block, write buffer 802 need not be necessary.

Figure 9A:
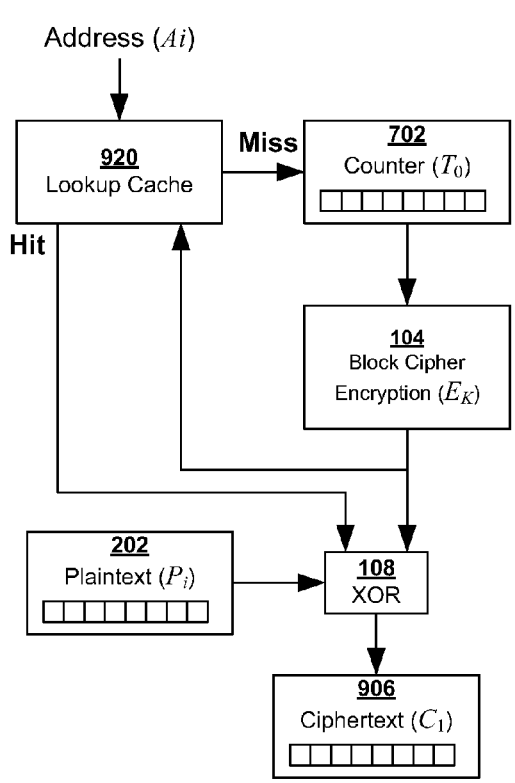
FIG. 9A illustrates a block diagram of encryption using a cache.

If memory 610 is a faster memory, one method is to employ a cache of the address based pads. FIG. 9A illustrates a block diagram of encryption using a cache. To store a plaintext block to encrypted memory at address $A_i$, cache 920 is checked to see if the address based pad corresponding to address $A_i$ is stored. If it is, that is a cache hit and that block is retrieved and XORed with plaintext block 202 (retrieved from buffer 804 in the example of FIG. 8) to generate ciphertext block 906. Ciphertext block 906 is then stored in memory at address $A_i$. If there is no address based pad corresponding to address $A_i$ stored in cache 920, a cache miss, then counter function 702 produce an addressed based counter from address $A_i$ which is encrypted by block cipher 104 to produce the corresponding address based pad. The resultant address based pad is stored in cache 920 as corresponding to address $A_i$ and XORed with plaintext block 202 to generate ciphertext block 906.

Figure 9B:
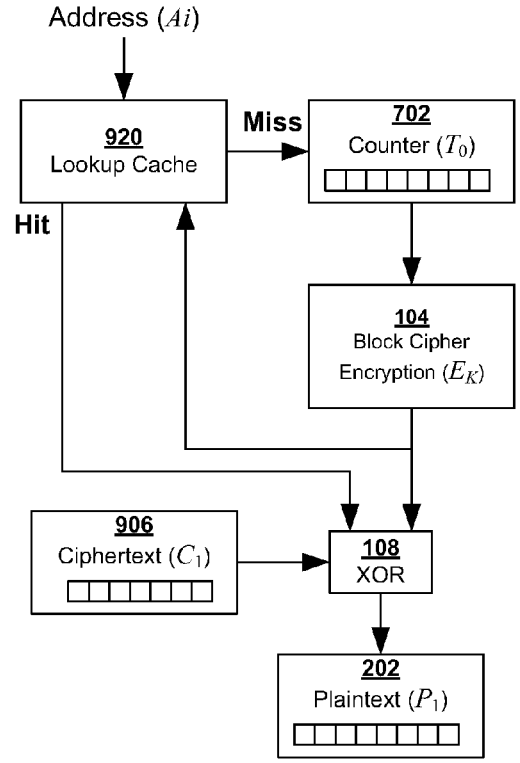
FIG. 9B illustrates a block diagram of decryption using a cache.

Similarly, FIG. 9B illustrates a block diagram of decryption using a cache. To retrieve a block in encrypted memory at address $A_i$, ciphertext block 906 is retrieved from memory at address $A_i$ and cache 920 is checked to see if the address based pad corresponding to address $A_i$ is stored. If there is a cache hit and the address based pad is retrieved and XORed with ciphertext block 906 to retrieve plaintext block 202. If there is a cache miss, then counter function 702 produce an addressed based counter from address $A_i$ which is encrypted by block cipher 104 to produce the corresponding address based pad. The resultant address based pad is stored in cache 920 as corresponding to address $A_i$ and XORed with ciphertext block 906 to retrieve plaintext block 202. In general it is desirable though not necessary for the same cache to be used for encryption and decryption primarily because a block store is presumably needed for retrieval sometime in the future.

Figure 10A:
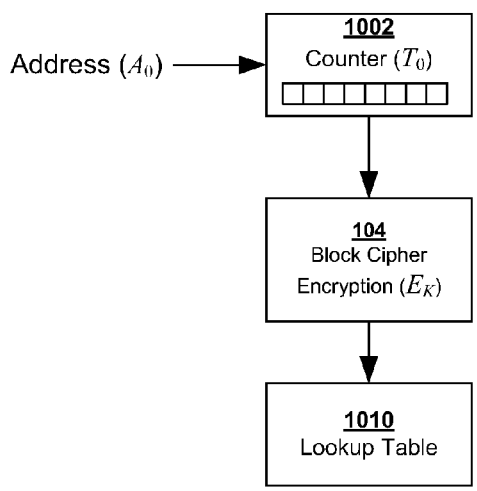
FIG. 10A illustrates the construction of the lookup table 1010.
Figure 10B:
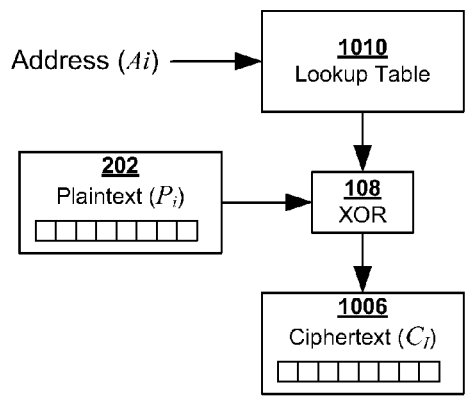
FIG. 10B illustrates a block diagram of the encryption and storage using a lookup table.
Figure 10C:
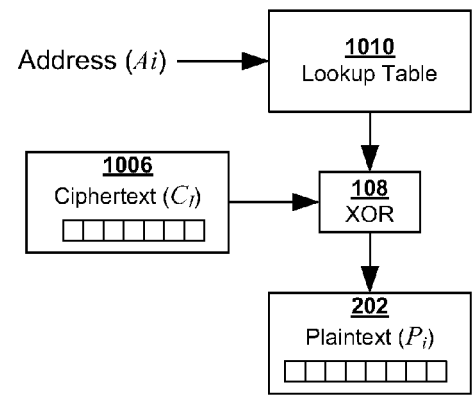
FIG. 10C illustrates a block diagram of the decryption and retrieval using a lookup table.

Another method of improving the latency performance is to store the results of the encryption ($E_K(T_i)$) in a lookup table. FIG. 10A illustrates the construction of the lookup table 1010. Each address in the address space of the memory is converted to counter block 1002. Each counter block is then encrypted with block cipher 104 to produce an address based pad which is stored in lookup table 1010. FIG. 10B illustrates a block diagram of the encryption and storage using lookup table 1010. To store a plaintext block to encrypted memory at address $A_i$, the address based pad corresponding to address $A_i$, encrypted and stored in lookup table 1010 is retrieved and XORed with the plaintext 202 and stored to the memory as ciphertext block 1006. Ciphertext block 1006 is then stored at address $A_i$ in memory. FIG. 10C illustrates a block diagram of the decryption and retrieval using lookup table 1010. To retrieve a plaintext block from encrypted memory, ciphertext block 1006 is retrieved from address $A_i$ and XORed with the address based pad stored in lookup table 1010 corresponding to address $A_i$ to recover plaintext block 202.

However, to store that many results would require a memory at least as large as that of the encrypted storage memory. This generally is not practical. And in essence a one-time pad would be cryptographically stronger and could employ the same amount of storage as the address based pads.

Figure 11:
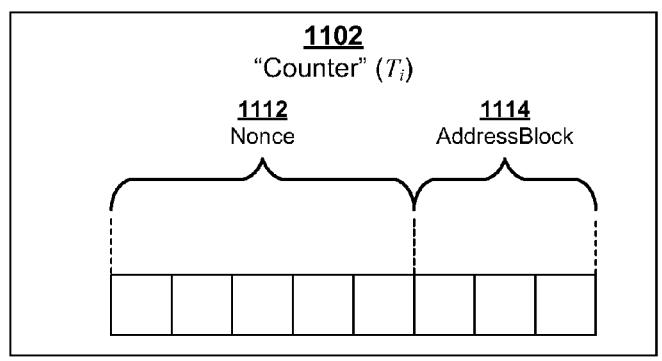
FIG. 11 illustrates the construction of a counter block comprising a nonce and an address block where the address block is a subset of an address.

One method of reducing the memory requirements is to use only part of the address to create a counter block. FIG. 11 illustrates the construction of counter block 1102 which comprises nonce 1112 and address block 1114, where address block 1114 is a subset of an address. For instance, if the memory uses 32-bits, address block 1114 could be the least significant 16-bits of the address. Of course any subset of the address could be used including the most significant bits or any internal combination of bits. For more obscurity it could be an arbitrary bit pattern such as the odd bits or every fourth bit.

While the use of subsets of the address can dramatically reduce the amount of storage required in a lookup table, it does open up additional vulnerability. For the sake of example, suppose that 16 most significant bits of the address are used in a 32-bit address space, then 256 k addresses are associated with each counter block. If an attacker has access to both the plaintext block and ciphertext block, i.e., can read the memory as well as write to it, the attacker can deduce the encrypted counter block and be able to access all 256 k addresses. In general, this vulnerability allows an attacker to completely bypass the cryptographic power of the block cipher since knowing the encrypted counter blocks is sufficient for decrypting stored ciphertext, i.e., knowledge of the key or counter blocks are not necessary. Even if it were not necessary to reduce the number of address based pads as in the case of the system in FIG. 7B and FIG. 8B. Knowledge of both the cipher text and plaintext corresponding to a particular location in memory would make it possible to decrypt that given location in memory for any future ciphertext content. It would also allow deliberate modification of the ciphertext memory content, to represent specific plaintext.

Figure 12B:
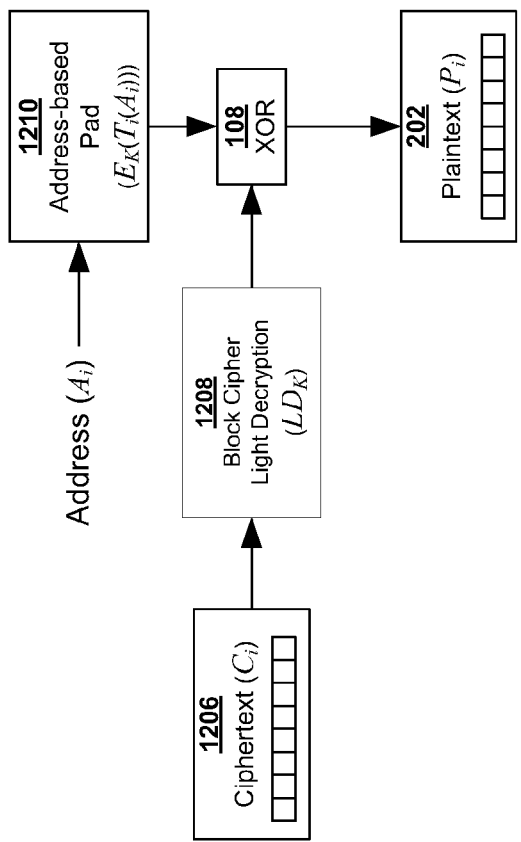
FIG. 12B illustrates the corresponding decryption system to the system in FIG. 12A.
Figure 12A:
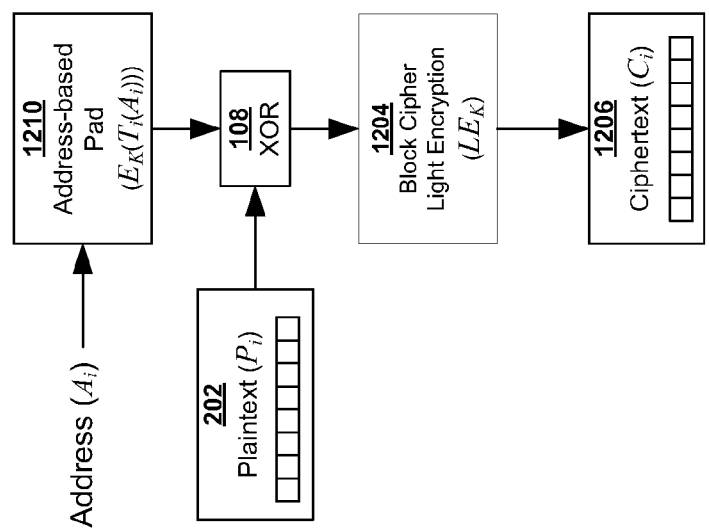
FIG. 12A illustrates a block diagram of encrypted storage which overcomes the vulnerabilities introduced using address based pads.

FIG. 12A illustrates a block diagram of encrypted storage which overcomes the vulnerabilities introduced using addressed based pads in general, including when subsets of addresses are used. Primarily, it thwarts the "known plaintext" vulnerability. When storing plaintext block 202 to address $A_i$, the address based pad corresponding to address $A_i$ is retrieved or calculated and XORed with plaintext block 202. The resultant block is then encrypted with light encryption block cipher 1204 which performs a "light encryption," to produce ciphertext block 1206 which is then stored in memory at address $A_i$. FIG. 12B illustrates the corresponding system to retrieve a plaintext block at address $A_i$, ciphertext block 1206 is retrieved from address $A_i$ and decrypted with block cipher 1208 which reverses the light encryption of block cipher 1204, the resultant block is then XORed with address based pad 1210 corresponding to address $A_i$ to obtain plaintext block 202.

It should be noted that the use of light encryption block cipher 1204/1208 is equally applicable to the systems of FIGS. 7B and 8B, the use of caches or the use of lookup tables.

The light encryption block cipher is any symmetric cipher, but emphasis is placed on speed and low latency rather than security. Depending on the application, light encryption could be a full blown block cipher or a mere obfuscation of the block. Examples of light encryption are discussed below.

Figure 13B:
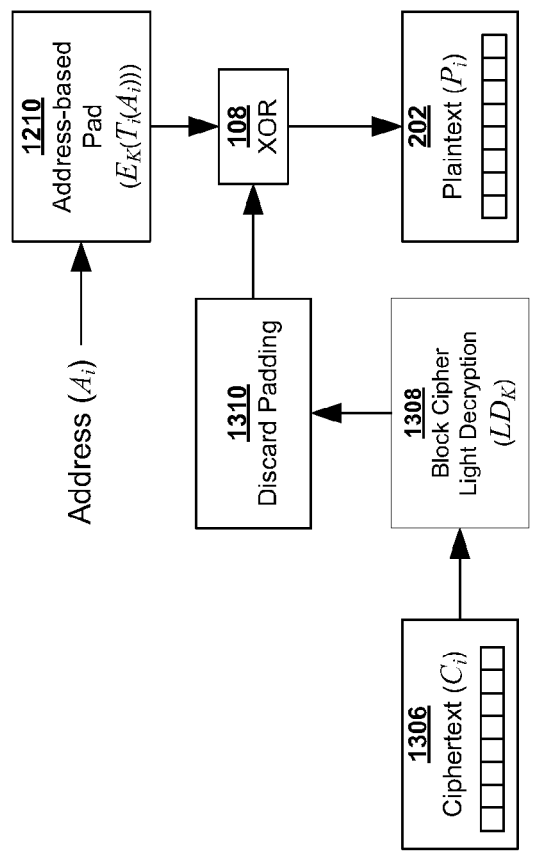
FIGS. 13A and 13B illustrates a block diagram of another alternate embodiment of encrypted storage.
Figure 13A:
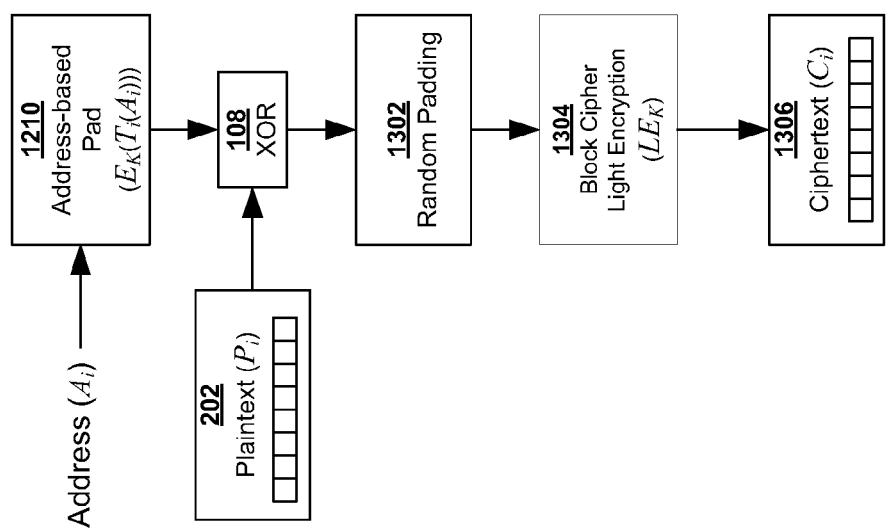

FIGS. 13A and 13B illustrate a block diagram of another alternate embodiment of encrypted storage. In the encryption path shown in FIG. 13A, prior to the light encryption, a random pad is applied by random padding module 1302. Block cipher 1304 is a wider block cipher that accommodates the padding. For example, if the original block size is 256-bits and a random pad of 16-bits is added, then block cipher 1304 should be 272-bit block cipher. Additionally, ciphertext block 1306 would be 272 bits while plaintext 202 is 256 bits. This would result in an increase storage requirement, but in exchange the security would be enhanced because the same plaintext block stored in at the same address would yield two different ciphertext blocks. In the decryption path shown in FIG. 13B, after retrieved ciphertext 1306 is decrypted by block cipher 1304, the padding is discarded by module 1310. The rest of the process is as described for FIGS. 12A and 12B. The manner of padding can be dependent on the nature of the light encryption. To make the random padding effective, the "randomness" should be diffused throughout the ciphertext. For example, if the light encryption employs a block cipher using a "diffuse and confuse" approach as described below in FIG. 16, appending or prepending a random pad to the plaintext prior to applying the light encryption would suffice. If the light encryption employs smaller block ciphers as described below in FIG. 15 interlacing the random pad with the plaintext prior to applying light encryption would provide better protection.

Figure 14B:
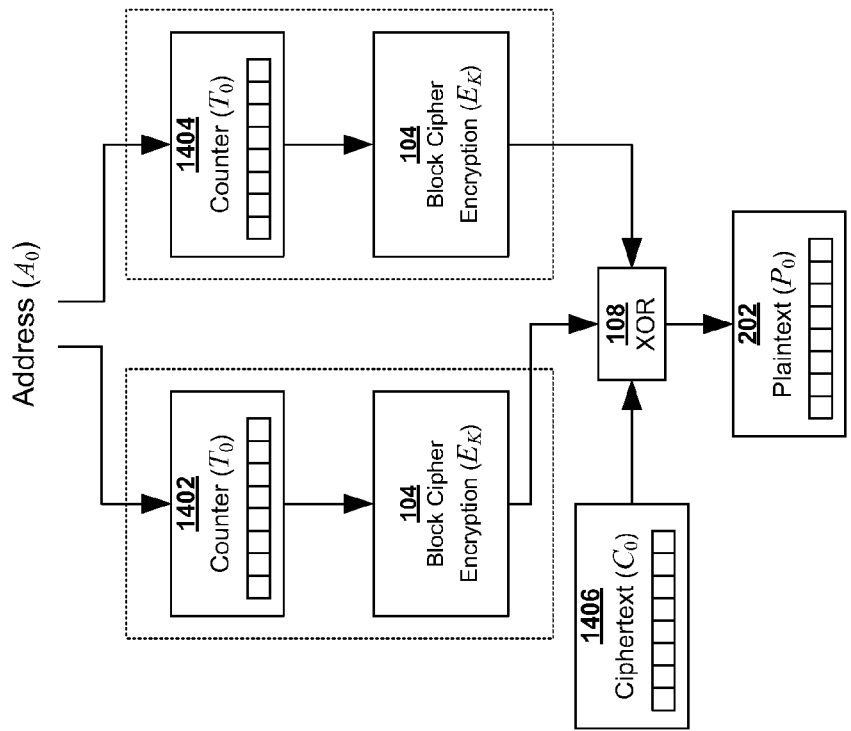
FIGS. 14A and 14B illustrates a block diagram of another alternate embodiment of encrypted storage.
Figure 14A:
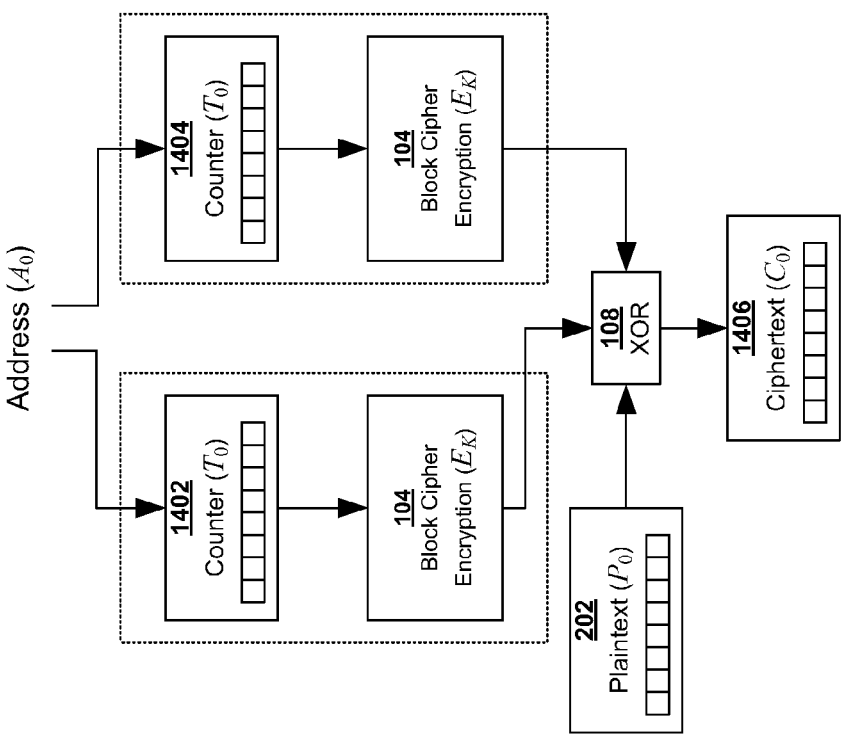

FIGS. 14A and 14B illustrate a block diagram of another alternate embodiment of encrypted storage. Unlike FIG. 7A, a memory address is subdivided into two or more subsets to produce two address-based counter blocks 1402 and 1404. For example, counter block 1402 could comprise a nonce and the most significant 16 bits of a 32-bit address and counter block 1404 could comprise another nonce and the least significant 16 bits of a 32-bit address. Alternatively, the odd bits and the even bits could be used. In other variations, three subsets could be used such as the most significant 11 bits, the middle 10 bits and the least significant 11 bits. The combinations and divisions would no doubt be apparent to one of skill in the art. In keeping to the example in FIGS. 14A and 14B, the memory address is subdivided into two subsets to produce address-based counters 1402 and 1404. These counter blocks are encrypted by block cipher 104, these address-based pads can be stored in lookup tables similar to what has been described in FIGS. 12A and 12B to reduce latency and improve performance or could be computed in parallel on the fly in an implementation similar to FIG. 7B and FIG. 8B. In the encryption path, shown in FIG. 14A, the result of the encrypted counter blocks 1402 and 1404 are XORed together with plaintext block 202 to generate ciphertext block 1406 which is stored at address $A_i$. Likewise, as shown in FIG. 14B, the decryption reverses the role of ciphertext and plaintext. This embodiment can also be used in conjunction either with the light encryption variants of FIGS. 12A and 12B and can also be used in conjunction with the light encryption with random padding of FIGS. 13A and 13B.

Figure 15A:
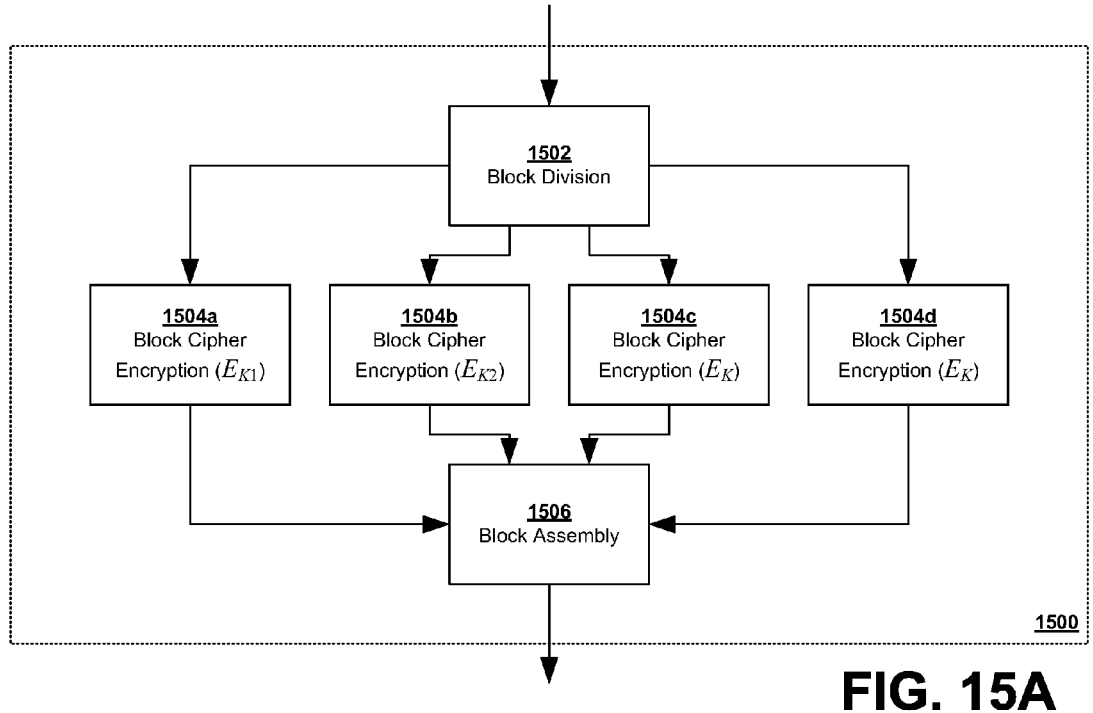
FIG. 15A illustrates one basic approach to deriving a light encryption algorithm.
Figure 15B:
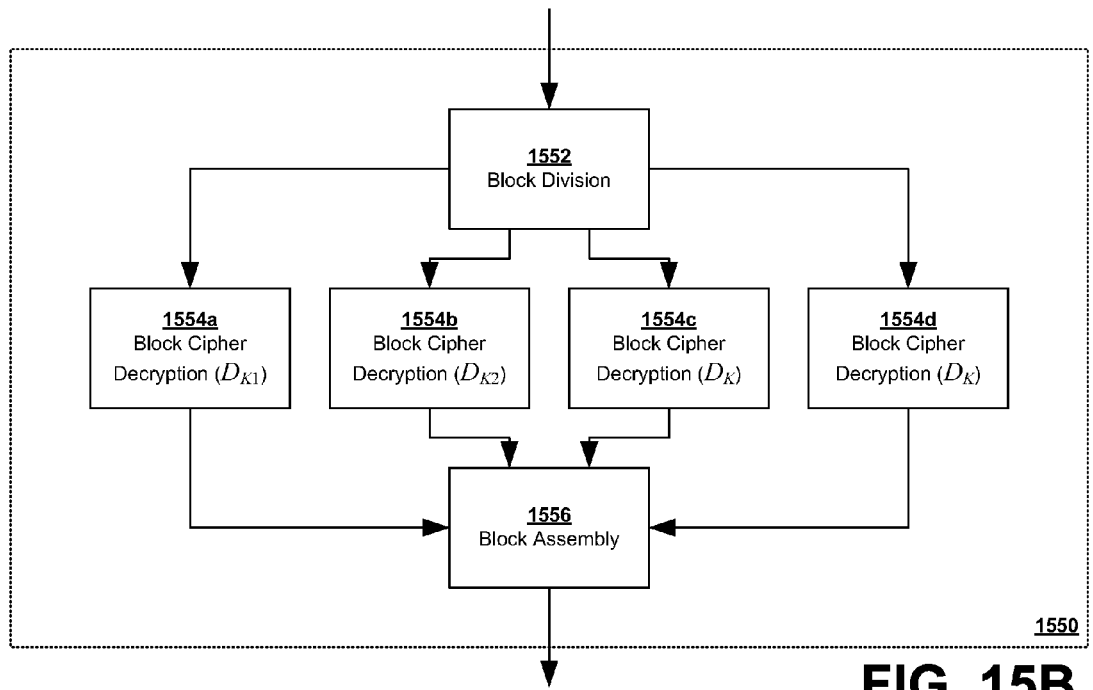
FIG. 15B illustrates decrypting the light encryption algorithm of FIG. 15A.

A number of the above embodiments employ light encryption. While the term is somewhat subjective, examples can include 2 parallel AES-128 block ciphers when block size is 256 bits. However, advanced encryption standard (AES) even at 128 may still have significant latency, but does offer stronger security. FIG. 15A illustrates one basic approach to deriving a light encryption algorithm. Module 1502 splits the block into smaller subblocks. A plurality of block ciphers 1504a, 1504b, 1504c, 1504d, etc, encrypt each of these subblocks. The encrypted subblocks are then assembled by module 1506. Each block cipher can use a different key, e.g., $K_1$, $K_2$, $K_3$, and $K_4$ in the example shown. Since most block ciphers that are scalable tend to have a superlinear complexity, they tend to scale down with less complexity than simply a scale factor, e.g., cutting the block size in half reduces complexity by more than half, leading to a net latency and complexity savings. Furthermore, by using parallel block ciphers, the process is parallelizable for further performance improvements. There are a number of 64 bit block ciphers which can be used such as DES, Triple-DES, IDEA, CAST-128 (named for creators Carlisle Adams and Stafford Tavares), Mitsubishi Improved Security Technology (MISTY1), and KHAZAD. The Hasty Pudding cipher (HPC) and SKIP32 can operate on even smaller block sizes still. FIG. 15B illustrates decrypting the light encryption algorithm. Module 1552 splits the ciphertext block into smaller subblocks. A plurality of block ciphers 1554a, 1554b, 1554c, 1554d, etc decrypt each of these subblocks and module 1556 assembles the decrypted subblocks into the plaintext message.

Figure 16A:
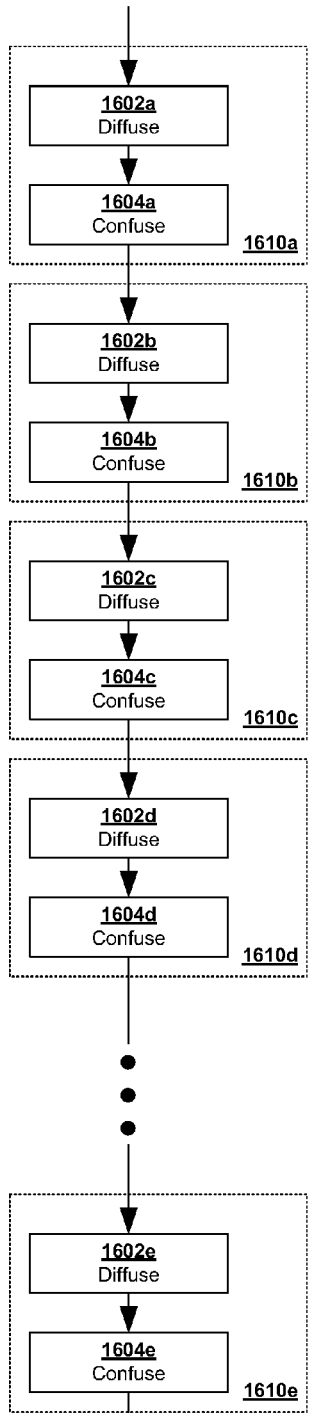
FIG. 16A illustrates a typical block ciphers comprising a plurality of rounds.
Figure 16B:
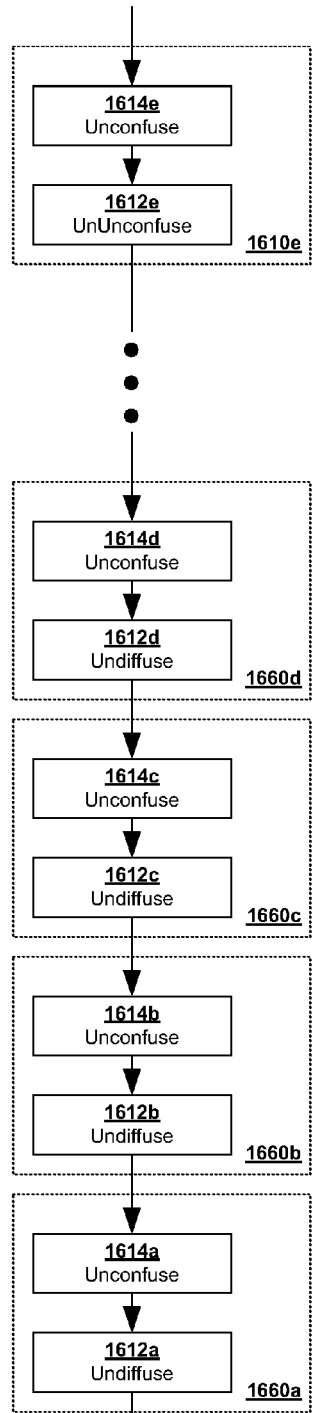
FIG. 16B illustrates the decryption of the block cipher encryption shown in FIG. 16A.

In addition, many conventional block ciphers can be "lightened." For example, in FIG. 16A, block cipher 1600 is typical of many block ciphers, it comprises a plurality of rounds which comprise a diffusion operation and a confusion operation. The diffusion operation can comprise a permutation operation and the confusion operation can comprise a substitution operation. Each round can contain a different diffusion operation and a different confusion operation although they need not. Furthermore, the diffusion operation and/or confusion operation can be dependent on a key. In most block ciphers of this type at least the confusion operation in each round depends on the supplied key. Similarly, FIG. 16B illustrates the decryption of the block cipher shown in FIG. 16A. Essentially, the rounds are performed in reverse order and each round comprises an "unconfusion" operation and an "undiffusion" operation which acts in the reverse order to the confusion operation and the diffusion operation. This type of block cipher includes the category known as substitution-permutation block ciphers such as AES.

In FIG. 16C, block cipher 1620 is a lightened version of block cipher 1600 and comprises a subset of the plurality of rounds. Naturally, the reduced number of rounds makes the cipher less secure, but the reduction also improves the latency of this lightened block cipher. The decryption counterpart to block cipher 1620 is shown in FIG. 16D as block cipher 1670.

Another significant block cipher architecture are Feistel network block ciphers. FIG. 17A illustrates a basic example. To encrypt plaintext block 202, it is divided into two half blocks. Variants on the Feistel network divide the block into asymmetric subblocks. One of the two half blocks undergoes a function F which is based on a key $K_i$ in each round and combined with the other half block. In a subsequent round, each the other half block undergoes a function F which is based on key $K_{i+1}$ and combined. For example, in round 1712a, the second half block has F applied to it with key $K_0$ and the result is combined with the first half block by combiner 1708. In the next round 1712b, the first half block has F applied to it with key $K_1$ and the result is combined with the second half block. In the round third and fourth round, the first half block is replaced by the results of the combination in round 1712a and the second half block is replaced by the results of the combination in round 1712b. The process repeats until the cipher is considered "secure enough." Most standard ciphers proscribe the number of rounds required to meet their cryptographic specification.

FIG. 17B illustrates decryption in a Feistel network block cipher. Basically, the rounds are performed in the reverse order, but instead of a combiner, "uncombiner" 1718 is used. For example, if an addition operation were used as a combiner, a subtraction operation is used as an uncombiner. Classically, an XOR is used as a combiner so that an XOR can also be used as an uncombiner.

Figure 17C:
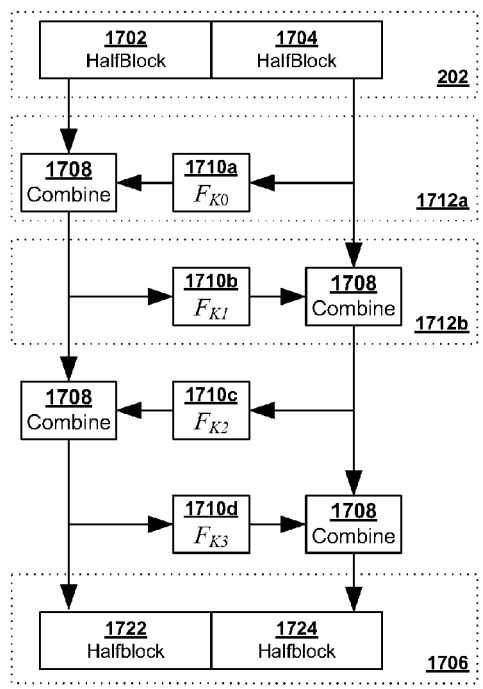
FIG. 17C illustrates encryption in a lightened Feistel network block cipher.
Figure 17D:
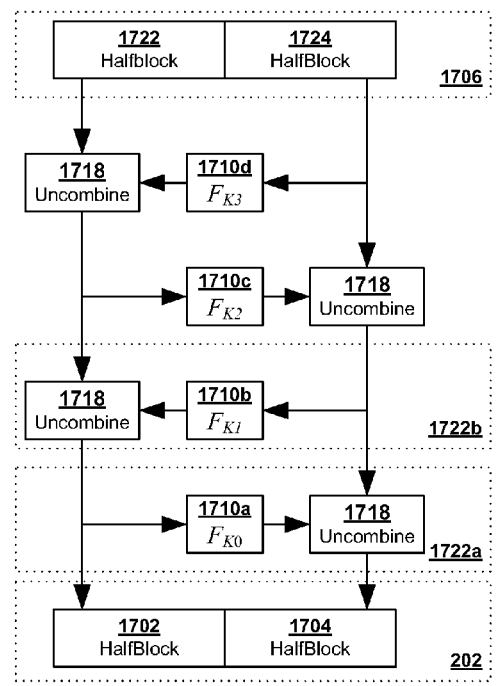
FIG. 17D illustrates decryption in a lightened Feistel network block cipher.

FIG. 17C illustrates how a Feistel network can be "lightened." Basically, the cipher of FIG. 17C takes a subset of the plurality of rounds used in FIG. 17A. For example, DES specifies using 16 rounds. A lightened DES cipher could employ 4 rounds. This would cut the latency down by a factor of 4. FIG. 17D illustrates the corresponding decryption block diagram for the lightened Feistel network cipher.

A specific example of a Feistel network which has been popular for fast operations is the tiny encryption algorithm (TEA). FIG. 18A illustrates an encryption cycle of TEA which is two Feistel rounds. TEA is a 64-bit cipher and employs a 128-bit key (some variations use multiple 128-bit keys) which can be represented by 4 32-bit keys $K_1$, $K_2$, $K_3$, and $K_4$. During each cycle, the second 32-bit half block is shifted left by four bits (1806) and added to $K_1$(1812); the second 32-bit half block is also added to a constant, $\delta_i$(1804), where i represents an cycle index; the second 32-bit half block is also shifted right by five bits (1808) and added to $K_2$(1814); and all three sums are XORed together (108). The result is added to the first 32-bit half block (1802). In the second round within the cycle, the result of the sum, now the first 32-bit half block, is shifted by four bits (1806) and added to $K_3$(1816); the first 32-bit half block is also added to $\delta_i$ (1804); the first 32-bit half block is also shifted right by five bits (1808) and added to $K_4$(1818); and all three sums are XORed together (108). The result is added to the second 32-bit half block (1802).

The $\delta_i$ is used in each round is a different multiple of $\delta$ so that no bit of the multiple will not change frequently. Traditionally, the number $\delta$ is derived from the golden ratio and typically $\delta=2^{31}(\sqrt{5}-1)$.

Figure 18B:
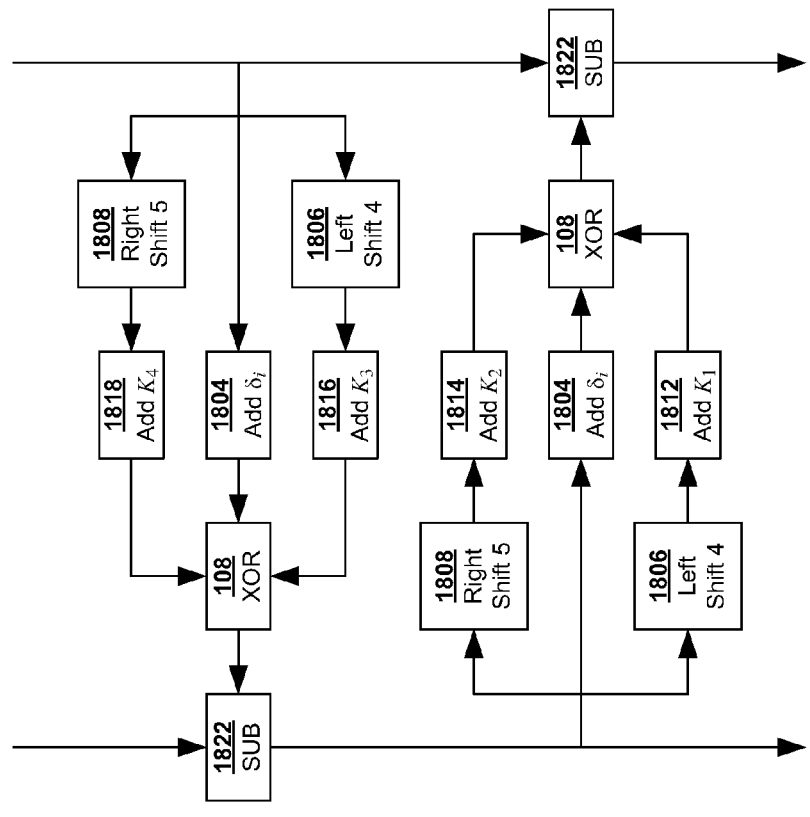
FIG. 18B illustrates a decryption cycle using TEA.
Figure 18A:
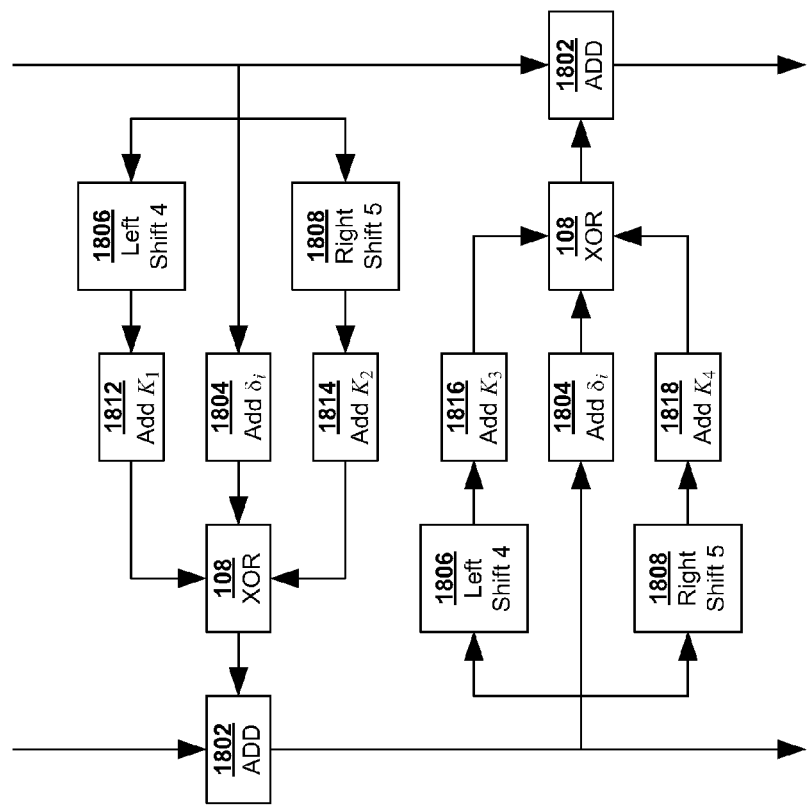
FIG. 18A illustrates an encryption cycle of TEA which is two Feistel rounds.

FIG. 18B illustrates decryption using TEA. The blocks function the same as during the encryption as described for FIG. 18A with the exception that block 1822 is used to subtract the result from the XOR from each half block.

The recommendation for TEA is 32 cycles or 64 rounds. TEA can be lightened a small number of cycles. A reduction to 4 cycles can reduce latency by 8 fold. One can appreciate that the same approach can be applied to all of TEA's successors such as extended TEA (XTEA) and extended XTEA (XXTEA).

For most modern block ciphers of the Feistel network, substitution-permutation network or other types, there is a recommended number of rounds to insure security which are usually published with the encryption standard. For example AES uses 10 rounds for AES-128 12 rounds for AES-192 and 14 rounds for AES-256, DES use 16 rounds, blowfish use 16 rounds. For the purposes of this disclosure, this shall be referred to as the recommended number of rounds for security.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed:

1. A encrypted storage device comprising:
a memory;
an encryption module; and
an XOR module coupled to the memory and the encryption module; wherein the encryption module comprises:
a counter function that converts a memory address and a nonce into an address based counter; and
a block cipher that encrypts the address based counter into an address based pad; wherein encrypted data read from the memory at the memory address is XORed by the XOR module with the address based pad to produce unencrypted data and unencrypted data is XORed by the XOR module with the address based pad to produced encrypted data that is stored into the memory at the memory address, and wherein the nonce comprises a one-time random number shared between an encrypting party and a decrypting party; and
further comprising a light encryption block cipher coupled to the XOR module and an input/output of the encrypted storage device; and
wherein the light encryption block cipher comprises a plurality of parallel block ciphers having a block size smaller than the block size of the block cipher in the encryption module.

2. A method of reading from an encrypted storage having a memory at a memory address, said method comprising:
receiving a nonce from an encrypting party;
retrieving previously encrypted data from the memory at the memory address;
concurrently to retrieving, determining an address based pad based on the memory address using the nonce; and
decrypting the previously encrypted data to produce plaintext data,
said decrypting comprising applying an XOR operation to the address based pad and the previously encrypted data to produce plaintext data.

3. The method of claim 2 wherein said decrypting further comprises transforming the previously encrypted data by applying decryption by a light encryption block cipher prior to applying the XOR operation.

4. The method of claim 3 wherein decrypting further comprising discarding a random pad.

5. The method of claim 2 wherein the light encryption block cipher comprises a plurality of parallel block ciphers having a block size smaller than the block size of the block cipher in the encryption module.

6. The method of claim 2 wherein the light encryption block cipher comprises a predetermined number of rounds of a confusion-diffusion cipher.

7. The method of claim 2 wherein the confusion-diffusion cipher is the advanced encryption standard (AES).

8. The method of claim 2 wherein the light encryption block cipher comprises a predetermined number of rounds of a Feistel Network.

9. The method of claim 2 wherein the Feistel Network is selected from a group consisting of tiny encryption algorithm (TEA), extended TEA (XTEA) and extended XTEA.

10. An encrypted storage comprising:
a memory;
a processor configured to retrieve previously encrypted data from the memory at a memory address:
the processor further configured to retrieve an address based pad based on the memory address concurrently to retrieving encrypted data from memory;
the processor further configured to receive a nonce from an encrypting party; and
the processor configured to decrypt the encrypted data to produce plaintext data,
the processor further configured to apply an XOR operation to the address based pad and the previously encrypted data to produce plaintext data.

11. The encrypted storage of claim 10 wherein the processor is further configured to apply a light encryption block cipher that transforms the previously encrypted data by applying decryption to the previously encrypted data prior to any XOR operation.

12. The encrypted storage of claim 10 wherein the processor is further configured to discard a random pad.

* * * * *